Patented Mar. 25, 1930

1,752,214

UNITED STATES PATENT OFFICE

LEONARD SCHADE VAN WESTRUM, OF LONDON, ENGLAND, ASSIGNOR TO BITUCRETE LIMITED, OF LONDON, ENGLAND, A BRITISH COMPANY,

MANUFACTURE OF BITUMINOUS CONCRETE

No Drawing. Application filed May 16, 1927, Serial No. 191,939, and in Great Britain May 31, 1926.

This invention relates to an improvement in or modification of that described in my application filed Feb. 11, 1926, Serial No. 87,680.

By this invention, broken stone, gravel, sand or the like is mixed dry with true cement or a cementitious powder consisting of a mixture of a true cement (lime, Portland cement, plaster of Paris) and stone or slag flour, with or without oxide of iron, and the mixture is further mixed with a bituminous soap.

The cementitious powder must be finely ground; preferably at least half of it should pass a 200 mesh sieve and none should remain on a 50 mesh sieve.

The bituminous soap should be free from acid and is made by mixing bituminous substances (asphalt, bitumen, petroleum residue) with vegetable oil and saponifying the mixture. For instance, 30-50 parts by weight of bitumen are mixed hot, but not above 350° F. and 2-5 parts of a vegetable oil with or without the addition of resin, whereupon the mixture is saponified by heating it with 20-40 parts of weak alkali lye.

The true cement or cementitious powder (consisting, for instance, of 4 parts of Portland cement, 3 parts of lime or plaster of Paris, 2 parts of oxide of iron and 6 parts of stone or slag flour) is mixed dry with the aggregate in the proportion of about 5 to 20 per cent true cement or powder to the aggregate, and a quantity of bituminous soap at least equal to that of true cement or cementitious powder is added and the whole thoroughly mixed to form a homogeneous mass.

Having thus described the nature of the said invention and the best means I know of carrying the same into practical effect, I claim:—

1. The process for the manufacture of bituminous concrete, comprising first mixing a dry cement and an aggregate in the proportion by weight of from 5 to 20 per cent of cement to from 95 to 80 per cent of the aggregate, and then forming a homogeneous mass by mixing with said mixture from 5 to 20 per cent of the weight of said mixture of a soap formed by heating with dilute aqueous alkali a mixture of from 30 to 50 parts by weight of bitumen and from 2 to 5 parts by weight of a vegetable oil.

2. The process for the manufacture of bituminous concrete, comprising first mixing in a dry state a cementitious powder consisting of 4 parts of Portland cement, 3 parts of plaster, 2 parts of oxide of iron and 6 parts of stone flour together with an aggregate in the proportion by weight of from 5 to 20 per cent of said cementitious powder with from 95 to 80 per cent of the aggregate, and then forming a homogeneous mass by mixing said mixture of cementitious powder and aggregate with from 5 to 20 per cent of the weight of said mixture of a soap formed by heating with dilute aqueous alkali a mixture of from 30 to 50 parts by weight of bitumen and from 2 to 5 parts by weight of a vegetable oil.

In testimony whereof I have signed my name to this specification.

LEONARD SCHADE VAN WESTRUM.